Nov. 19, 1946.   E. T. RIDGWAY   2,411,337
SPRING SUSPENSION
Filed Nov. 8, 1943          2 Sheets-Sheet 1

INVENTOR
Edmund T. Ridgway
BY John P. Tarbox
ATTORNEY

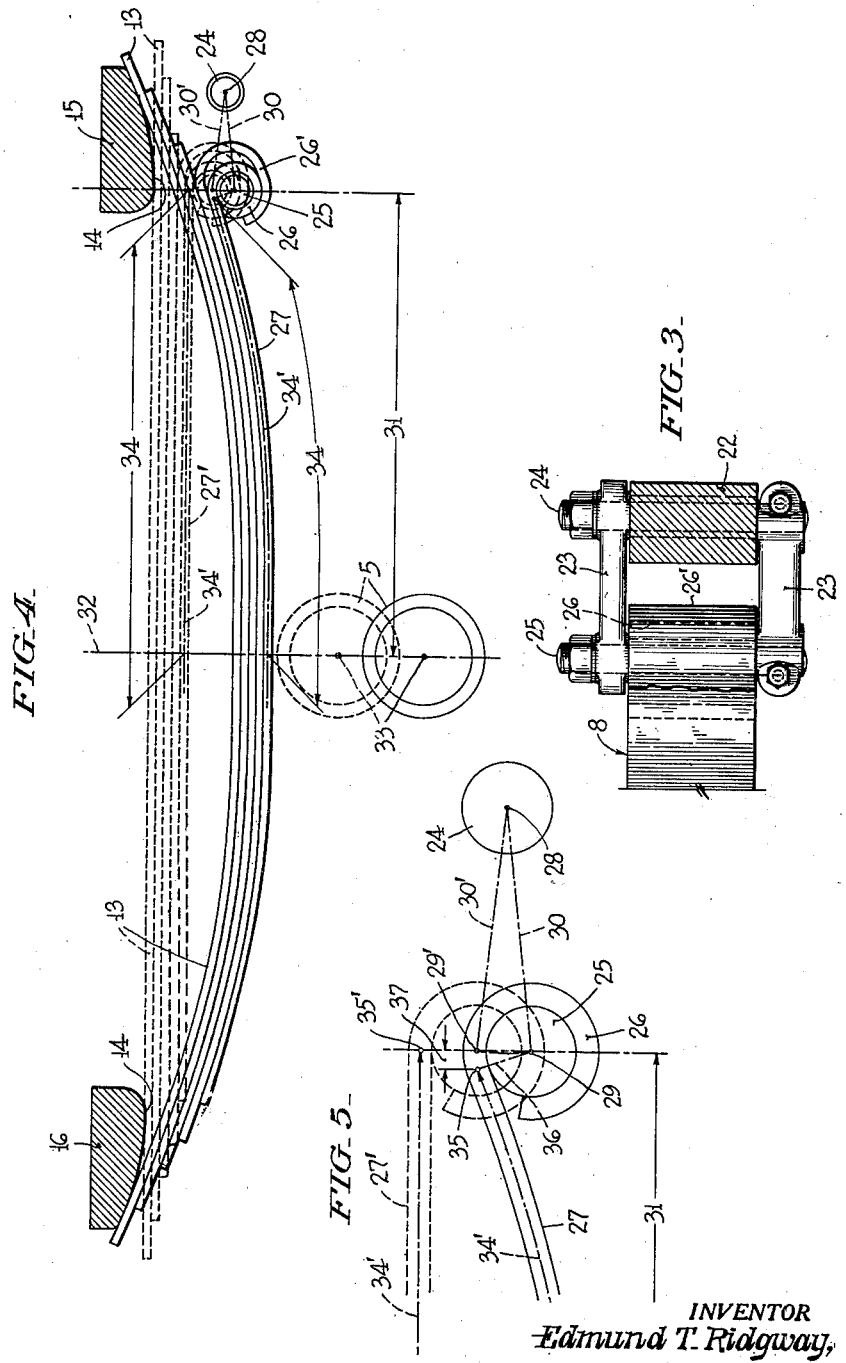

Patented Nov. 19, 1946

2,411,337

UNITED STATES PATENT OFFICE 2,411,337

SPRING SUSPENSION

Edmund T. Ridgway, Oaklyn, N. J., assignor to The Budd Company, Philadelphia, Pa., a corporation of Pennsylvania Application November 8, 1943, Serial No. 509,381

2 Claims. (Cl. 267—44)

The invention relates to a spring suspension, and more particularly to a spring suspension for road vehicles. Still more specifically, the invention relates to a spring suspension which is designed for trailers or semi-trailers.

Among the objects of the invention is a spring suspension which is simpler than those hitherto used for the same purpose.

Another object of the invention is a spring suspension, preferably of the progressive type, in which the wear of the moving parts and, consequently, the maintenance costs are decreased.

A still further object of the invention is a spring suspension which insures good riding qualities, indeed, riding qualities which are superior to those attained by the customary spring suspensions.

An object of the invention is also to minimize or overcome the wind-up and back-snap produced in the system with the conventional radius-rod and pinned-front-end types of spring suspension due to the arc of movement of the axle backward and upward. This effect, which is minimized or overcome by the invention, is most destructive at the forward end of the spring, at its hanger and on the supporting structure.

A further object of the invention is the reduction and more favorable distribution of the stresses produced by forward braking so that a more efficient structure is attained.

Among the objects of the invention is also a spring suspension which is rugged and durable in construction and adapted to transmit the braking forces from the wheel to the vehicle frame.

The aforesaid and other objects of the invention are mainly achieved by omitting the customary radius rod between the axle or wheels and the chassis frame and by providing between one end of the leaf spring and the frame a special type and arrangement of connecting means, including a link or shackle, adapted to transmit forces in horizontal direction, whereas the vertical load and stresses are transmitted by separate supports, such as a curved support, giving a progressive spring characteristic.

The details of the invention, its objects and advantages will be more clearly understood from the embodiment illustrated in the attached drawings and described in the following.

In the drawings,

Figure 3 is a fragmentary section along line 3—3 of Figure 1;

Figure 4 is a diagram showing the geometry of the new suspension in operation; and Figure 5 is a diagram showing substantially the right-hand part of Figure 4 but on a larger scale.

A through-running axle 5 carries in customary manner on each end a wheel indicated by the line 6. The wheel 6 is provided with a brake drum indicated by line 7; braking equipment between brake drum 7 and axle 5 is not shown.

Figure 2:
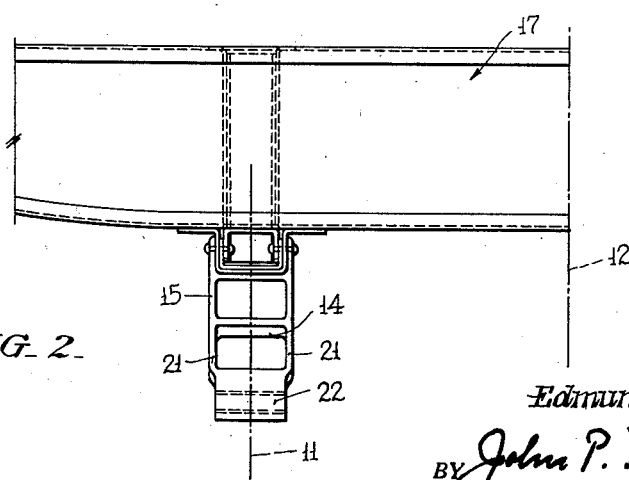
Figure 2 is a fragmentary front elevation of the underframe shown in Figure 1 and of the forward spring supporting bracket.

Secured to the axle 5 near each end thereof is a half-elliptic leaf spring 8 by means of clips 9. The longitudinal center line of one of the springs is indicated in Figure 2 at 11. Of course, there is a second spring at the same distance from but on the other side of the center line 12 of the vehicle. The illustration of the construction on one side of the vehicle and the description thereof will, however, completely suffice for explaining the invention.

The uppermost leaf 13 of the spring 8 has its ends resting by their upper surfaces against the curved surfaces 14 of a pair of brackets or hangers 15 and 16. These brackets are firmly secured to the frame 17 which offers no special interest and will, therefore, not be described in detail.

The bracket 16 is substantially of known design; its side walls are downwardly extended at 18 beyond the supporting surface 14 and are interconnected by a bolt 19 which cooperates with a downwardly extending safety lug 20 of one of the leaves of the spring. The purpose of the surfaces 14 is to reduce the effective length of the spring when the latter is straightened under increasing load, so that the spring characteristic adapts itself to varying loads.

Figure 1:
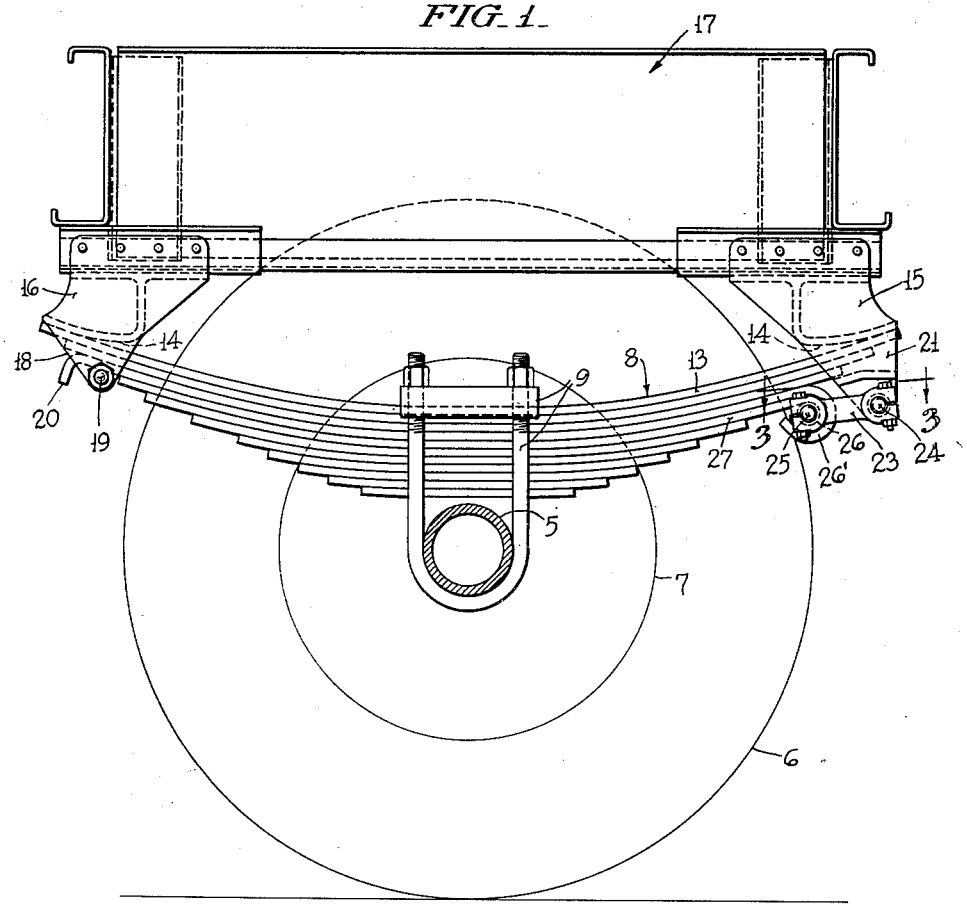
Figure 1 is a side elevation of a trailer underframe portion and of the new spring suspension, a section through an axle, and an outline of one of the wheels.

The forward bracket 15 has lateral portions 21 which extend downwardly beyond the surface 14 and have their lower ends interconnected by a portion 22. A pair of links or shackles 23 and a pair of bolts 24, 25 flexibly interconnect said bracket portion 22 and an eye 26 formed at the end of the leaf 27 of the spring 8. The eye 26 may be surrounded by a safety eye 26' formed on the next leaf. It will be noted that in Figure 1 the safety eye 26' is circular and should surround the eye 26, so as to permit the necessary freedom of movement whereas in Figure 4 the safety eye 26' is elongated and will consequently likewise not transfer any longitudinal stresses unless the main eye 26 or its leaf should break.

The members 23 may be termed "radius shackles," and the leaf 27 may be termed "tie leaf."

The geometry of the new suspension is illustrated diagrammatically in Figures 4 and 5.

When the vehicle is substantially unloaded or lightly loaded, the plane defined by the axes 28, 29 of the bolts 24, 25 slopes slightly downwardly toward the axle 8 as indicated by the line 30.

With increasing load, the radius shackle 23 will swing around the fixed axis 28 of the bolt 24 and reach, for instance, the position on the other side of the horizontal as indicated by point 29' and the line 30'. In both positions, the distance 31 between the axis 29, 29' of bolt 25 and the vertical plane indicated by line 32 extending through the axis 33 of the axle 5 is substantially the same. The length 34 of the neutral axis 34' measured from said plane 32 to its intersection 35 with the radius 36 of bolt 25 which is normal to the axis 34', is about equal to the aforesaid distance 31.

When the spring with the tie leaf 27 is straightened and assumes the position 27', the intersection 35 moves on a circle about the axis 29 to the location 35', that is, the distance of the point 35 from the plane 32 increases by the distance 37. The dimensions of the radius shackle, the length of the tie rod, the curvature of the spring, etcetera, are selected in the embodiment so that the distance 37 is about equal to the lengthening or rather to the lengthening of the vertical projection of the tie leaf when it assumes its straight form.

The consequence of the described geometry is that the axis 33 moves substantially vertically upwardly. The further consequence is that the longitudinal movement of the ends of the uppermost, supporting spring leaf 13, caused by the straightening of the latter, is substantially equally distributed over the surfaces 14 of both supporting brackets 15, 16. With the usual radius-rod or pinned-front-end types of spring suspension, the axle moves on a rearwardly and upwardly inclined arcuate path so that the entire amount of the straightening of the spring is translated into gliding movement relative to the rear bracket or such rearwardly gliding movement may even occur on the front and rear bracket.

The even distribution of the movement between spring and its rear support is of additional importance because of the vertical force produced with a forward braking condition, so that a reduction of the movement at the rear means a reduction of wear at a point where it is most likely to occur.

At the front end, the sliding action between the surface 14 and the supporting leaf 13 may be greater than with radius-rod type suspensions, but this is not too objectionable because under forward braking conditions, the vertical load at the forward end of the spring is relieved and accounts for reduction of friction and consequently of wear.

The angular movement of the horizontal shackle is not expected to be greater than the angular movement produced in the conventional vertical shackle. The load is expected to be less and, therefore, the life of the parts to be longer. This latter condition is due to the horizontal forces absorbed through friction at the rear end of the spring tending to reduce the stresses in the horizontal or radius shackle and, consequently, the forces on the forward hanger.

When severe forward braking is encountered, the wind-up of the spring is considered to produce a reversed curve on the rear half of the spring with the forward half remaining partially unsprung. The resultant movement of the axle from light load to this position is still almost exactly vertical. When the spring is thus in the wound-up position, the horizontal shackle in the forward half of the spring is in almost a straight line giving most direct transfer of forces from spring to shackle at the forward hanger, should the static friction at the rear end become sliding friction.

The geometry of the new suspension can be changed within certain limits so as to attain desired effects. A forwardly and upwardly inclined path for the axle may, for instance, be attained by imparting to the bolt 25 a forwardly and upwardly inclined movement or by increasing the length of the toggle radius 36.

It will of course be understood that various changes in details of construction and arrangements of parts may be made by those skilled in the art without departing from the spirit of the invention as set forth in the appended claims.

What is claimed is:

1. In a spring suspension for a vehicle: a first member; a second member; a half-elliptical leaf spring secured near its middle to said second member with its concave side facing said first member; means for transmitting exclusively loads vertically to the plane of the ends of the spring between the latter and said first member; a shackle connected swingably about axes extending parallel to the plane of the leaves and transversely to the longitudinal extent of the spring, respectively to said first member and near one end of the spring to the side of one of the leaves of said spring facing away from said first member for transmitting substantially all longitudinally directed forces between said first member and the spring with said second member, said shackle having under normal load a slight inclination from its connection to the first member away from the latter toward the middle of the spring, the distance of the neutral zone of the leaf connected to said shackle from the axis of such connection being so related to the increase in length of said leaf due to straightening under increased load that the length of the arc on which the connected part of said leaf moves is approximately equal to said increase in length with the effect that the middle of the spring with the second member moves on a substantially straight path in a plane intersecting the middle of the spring at right angles.

2. In a spring suspension for a vehicle: a frame member; a wheel supporting member; a longitudinally arranged, with its concave side upwardly facing, half-elliptical leaf spring secured near its middle to said supporting member; means for transmitting vertical loads only between the ends of the spring and said frame member; a shackle connected swingably about transverse axes, respectively to said frame member and to the underside of one of the leaves of said spring near one end of the latter for transmitting substantially all longitudinally directed forces between the frame member and the spring with said supporting member, said shackle having under normal load a slight downward slope from its connection to the frame member toward the middle of the spring whereas increased load will swing the shackle over the horizontal position to a slightly upward slope; the distance of the neutral zone of the leaf connected to said shackle from the axis of such connection being so related to the increase in length of the vertical projection of said leaf due to straightening under increased load that the length of the arc on which the connected part of said leaf moves is approximately equal to said increase in length with the effect that the middle of the spring with the supporting member moves on a substantially straight vertical path.

EDMUND T. RIDGWAY.